United States Patent [19]
Shibuya

[11] Patent Number: 5,535,054
[45] Date of Patent: Jul. 9, 1996

[54] ILLUMINATION OPTICAL SYSTEM

[75] Inventor: Masato Shibuya, Saitama, Japan

[73] Assignee: Nikon Corporation, Tokyo, Japan

[21] Appl. No.: 317,994

[22] Filed: Oct. 4, 1994

Related U.S. Application Data

[63] Continuation of Ser. No. 28,984, Mar. 10, 1993, abandoned.

[30] Foreign Application Priority Data

Mar. 11, 1992 [JP] Japan ................................ 4-086553

[51] Int. Cl.$^6$ .......................... G02B 5/30; G02B 27/28
[52] U.S. Cl. ..................... 359/487; 359/495; 359/497; 362/19; 362/296
[58] Field of Search ................................ 359/487, 494, 359/495, 497, 498; 362/19, 296

[56] References Cited

U.S. PATENT DOCUMENTS

| | | | |
|---|---|---|---|
| 3,443,858 | 5/1969 | Russa | 359/494 |
| 3,635,552 | 1/1972 | de Lang | 359/498 |
| 3,682,532 | 8/1972 | Myles | 359/494 |
| 3,704,061 | 11/1972 | Travis | 359/498 |
| 4,007,979 | 2/1977 | Coblitz | 359/487 |
| 4,963,003 | 10/1990 | Hiiro | 359/495 |
| 5,048,030 | 9/1991 | Hiiro | 359/495 |
| 5,155,623 | 10/1992 | Miller et al. | 359/495 |

FOREIGN PATENT DOCUMENTS

| | | |
|---|---|---|
| 434041A1 | 6/1991 | European Pat. Off. . |
| 3-191318 | 8/1991 | Japan . |
| 1321303 | 6/1973 | United Kingdom ................... 359/495 |

*Primary Examiner*—Ricky D. Shafer
*Attorney, Agent, or Firm*—Michael N. Meller

[57] ABSTRACT

An illumination optical system for supplying polarized illumination light to an object to be illuminated. The light from a light source is separated by a polarizing beam splitter into a first polarized light component as the illumination light and a second polarized light component which is different in polarizing direction from the first polarized light component. A first reflecting optical member for returning the second polarized light component to the light source side and a converging optical system are arranged in such a manner that a light source image due to the backward light from the first reflecting optical member is formed at a position apart from the light source in a direction substantially perpendicular to the optical axis of the converging optical system. The backward light is converted by a polarizing element to a polarized light of the same polarizing direction as the first polarized light component and it is again emitted from the polarizing beam splitter at an optical axis position adjacent to the first polarized light component.

11 Claims, 4 Drawing Sheets

ILLUMINATION OPTICAL SYSTEM

This application is a continuation of application Ser. No. 08/028,984, filed Mar. 10, 1993, now abandoned.

BACKGROUND OF THE INVENTION

1. Field of the Invention

The present invention relates to a polarized illumination optical system adapted to be used for example with a projection display apparatus employing a liquid crystal light valve or the like.

2. Description of the Prior Art

In the case of a liquid crystal projector, for example, it has been necessary to use an illumination optical system for supplying a linealy polarized illuminating light to its liquid crystal light valve. Then, heretofore known illumination systems have been so designed that after the light from a light source has been converged to a parallel beam, the parallel beam is separated into an S-polarized light and a P-polarized light by a polarizing beam splitter (hereinafter referred to as a PBS) so that the S-polarized light is utilized as an illumination light, whereas the P-polarized light is reflected by reflecting means and a part of the reflected light is converted to an S-polarized light by for example a quarter-wave plate or phase plate thereby utilizing it as an illumination light.

As one of such conventional illumination optical systems, a method has been known in which as for example, the reflected light is again reflected on the light source side and an S-polarized light component is taken out from the rereflected light so as to be utilized as an illumination light. In this case, the rereflection takes the form of irregular reflection and thus the polarizing condition of the rereflected light is disturbed thereby giving rise to the disadvantage that the polarized light components of the rereflected light cannot be fully utilized. Also, this method is disadvantageous in that not only the reflected light is considerably absorbed by the reflecting part on the light source side thus causing a loss in the light quantity, but also the reflected light is subjected to reflection a plurality of times so that even if the rereflected light is transmitted through a phase plate or the like, it is difficult to convert practically all of its components into an S-polarized light thus also increasing light quantity loss.

There has been known another conventional method in which of the polarized light components separated by a PBS, the S-polarized light is utilized as a first illumination component and the other polarized-light component or the P-polarized light is reflected in the same direction as the first illumination component and immediately passed through a phase plate thereby utilizing its S-polarized light component as a second illumination component. In this case, since the two illumination components are taken out separately, there are disadvantages that the light quantity cannot be utilized effectively on the surface to be illuminated and illumination irregularity tends to be caused and that it is necessary to provide some distance between the optical system and the surface to be illuminated.

SUMMARY OF THE INVENTION

It is the primary object of the present invention to provide an illumination optical system which overcomes the foregoing deficiencies in the prior art and which is capable of not only effectively utilizing the respective polarized light components from a light source but also accomplishing an uniform illumination of a light valve.

To accomplish the above object, in accordance with a basic aspect of the present invention there is thus provided an illumination optical system including a light source, polarizing light splitting means for separating the light from the light source into a first polarized light component which is supplied as a polarized illumination light to an object to be illuminated and a second polarized light component which is different in polarizing direction from the first polarized light component, a first reflecting optical member for reflecting the second polarized light component from the polarizing light splitting means to return as a backward light to the light source side, a polarizing element for changing the polarizing condition of the backward light from the first reflecting optical member, a converging optical system arranged between the light source and the first reflecting optical member and a second reflecting optical member whereby the backward light having its polarizing condition changed by the polarizing element is reflected so as to fall again on the polarizing element, and the light source, the polarizing light splitting means, the first reflecting optical member and the converging optical system are arranged in such a manner that an image of the light source due to the backward light from the first reflecting optical member is formed at a position apart from the position of the light source or conjugate position thereof with respect to a direction substantially perpendicular to the optical axis of the converging optical system.

In accordance with another preferred aspect of the present invention, the illumination optical system further includes a third reflecting optical system whereby a light source image due to the light emitted from the light source in a direction opposite to the illumination direction is formed at a position apart from the light source with respect to a direction substantially perpendicular to the optical axis of the converging optical system.

In the illumination optical system according to the present invention, the polarizing light splitting means for separating the light from the light source into two polarized light components which are different in polarizing direction from each other, the first reflecting optical member for returning one of the separated polarized light components as a backward light to the light source side and the converging optical system are relatively arranged in such relation that a light source image due to the backward light from the first reflecting optical member is formed at a position apart from the position of the light source or conjugate position thereof with respect to a direction which is substantially perpendicular to the optical axis of the converging optical system. As a result, the backward light is converted by the polarizing element to a polarized light of the same polarizing direction as the first polarized light component and it is again emitted from the polarizing beam splitter at an optical axis position adjacent to the first polarized-light component. In this case, the backward light is neither absorbed nor reflected from the light source portion so that its polarizing condition is not disturbed and therefore the light quantity loss, illumination irregularity, etc., are reduced.

Also, the illumination optical system of the present invention can be provided with the third reflecting optical member whereby the light emitted from the light source in a direction opposite to the illumination direction is imaged at a position apart from the light source with respect to a direction substantially perpendicular to the optical axis of the converging optical system, thereby making it possible to effectively utilize as an illumination light the exit light in the opposite direction.

The above and other objects, features and advantages of the present invention will become more apparent from the following description of its preferred embodiments which are illustrative only without any intension of limitation when taken in conjunction with the accompanying drawings.

DESCRIPTION OF THE PREFERRED EMBODIMENTS

Figure 1:
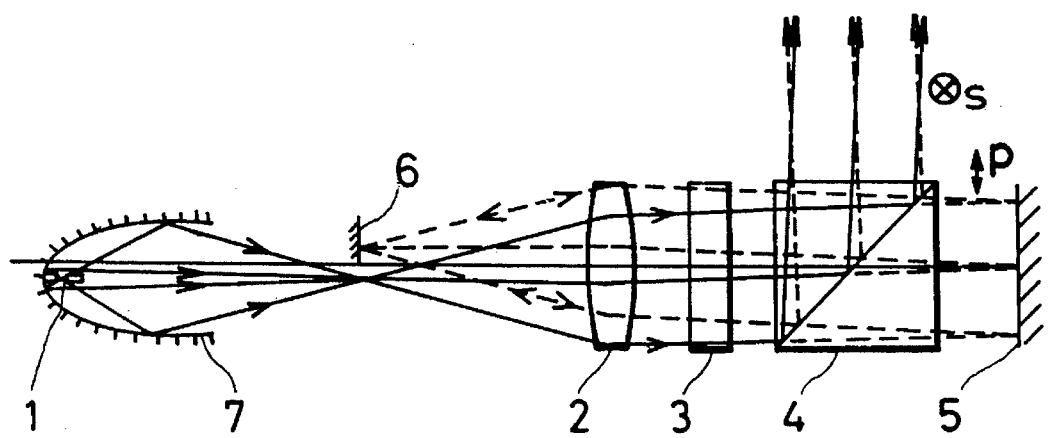
FIG. 1 is a schematic diagram showing the construction of an illumination optical system according to a first embodiment of the present invention.

Referring now to FIG. 1, there is illustrated a first embodiment of the present invention and the embodiment comprises an illumination optical system employing a discharge lamp as a light source 1. The light from the light source 1 is first converged at a first imaging position by an ellipsoidal mirror 7 and then it is caused to fall as a diffusing light beam on a condenser lens 2. After the light has been converted substantially into a parallel beam by the condenser lens 2, the beam is transmitted through a quarter-wave plate 3 and it is then directed to a polarizing beam splitter (PBS) 4. In the PBS 4, the S-polarized light component of the incident light is reflected and emitted as an illumination light upwardly in the Figure toward an object such as a liquid crystal light valve.

Of the incident light on the PBS 4 the P-polarized light component is transmitted through the PBS 4 and then reflected by a first reflecting member 5 to produce a backward light. This backward light is transmitted again but in the opposite direction through the PBS 4. Thus, the backward light transmitted through the PBS 4 is further transmitted through the quarter-wave plate 3 to produce a circularly-polarized light. This circularly-polarized backward light is converged by the condenser lens 2 so that a light source image is formed at a second imaging position which is apart from the first imaging position in a direction substantially perpendicular to the optical axis of the condenser lens 2. A second reflecting member 6 is arranged at this imaging point. As a result, the circularly-polarized backward light is again reflected toward the condenser lens 2 by the second reflecting member 6. This rereflected light is transmitted through the condenser lens 2 and the quarter-wave plate 3 so that it is converted to a substantially parallel S-polarized light and then directed to be incident on the PBS 4. The incident rereflected light (S-polarized light) is reflected inside the PBS 4 so that it is emitted, along with the previously mentioned S-polarized light component, as an illumination light upwardly in the Figure toward the object.

By virtue of this construction, not only the backward light or the rereflected light can be effectively utilized as an S-polarized illumination light, but also the direct illumination light from the light source 1 and the illumination light by the backward light are close in irradiation position to each other thus enhancing the uniformity of the illumination.

Figure 2:
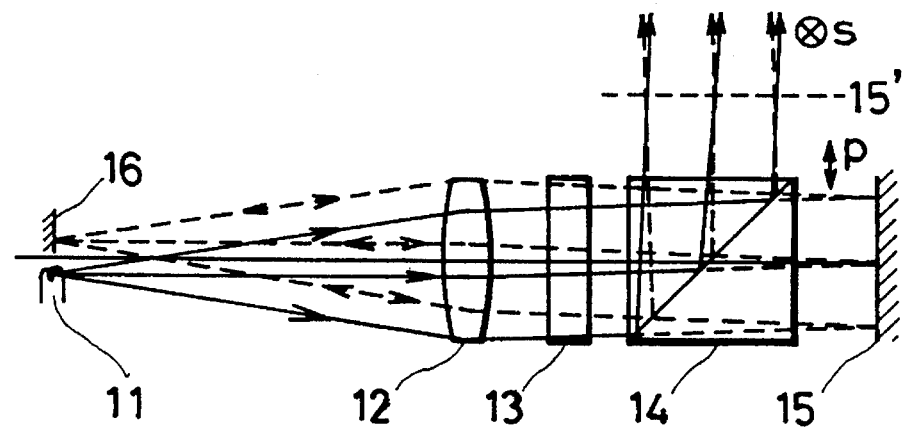
FIG. 2 is a schematic diagram showing the construction of an illumination optical system according to a second embodiment of the present invention.

FIG. 2 shows a second embodiment of the present invention and it comprises an illumination optical system in which an incandescent lamp is employed as a light source 11. The light from the light source 11 is transmitted through a condenser lens 12 so as to be converted to a substantially parallel beam so that this parallel beam is transmitted through a quarter-wave plate 13 and the beam is then directed to a PBS 14. Of the incident light on the PBS 14 the S-polarized light component is reflected inside the PBS 14 so that it is emitted as an illumination light upwardly toward for example a liquid crystal light valve.

On the other hand, of the light incident on the PBS 14 the P-polarized light component is transmitted through the PBS 14 and then reflected by a first reflecting member 15 to produce a backward light. This backward light is transmitted again but in substantially the opposite direction through the PBS 14 and the quarter-wave plate 13 to produce a circularly-polarized light. This circularly-polarized backward light is further converged by the condenser lens 12 so that a light source image is formed at a position apart from the light source 11 portion in a direction which is substantially perpendicular to the optical axis of the condenser lens 12. A second reflecting member 16 is arranged at this image forming point. As the result of the reflection by the second reflecting member 16, the converged circularly-polarized backward light is converted to a diffusing reflected backward light and it again falls on the condenser lens 12. The reflected backward light incident on the condenser lens 12 is again directed as a substantially parallel light beam from the condenser lens 12 to the quarter-wave plate 13 and thus it is converted to an S-polarized light by the quarter-wave plate 13. This S-polarized light falls on the PBS 14 so that it is reflected inside the PBS 14 and emitted as an illumination light upwardly in the Figure toward the object.

In this case, if the first reflecting member 15 is arranged at a position such that the first reflecting member is just subjected to Köhler illumination by the light source 11, both the direct illumination light from the light source 11 and the illumination light due to the backward light are caused to illuminate the same area of a plane 15' which is conjugate to the first reflecting member 15, thereby making efficient the illumination of an object to be illuminated, e.g., a liquid crystal light valve.

Figure 3:
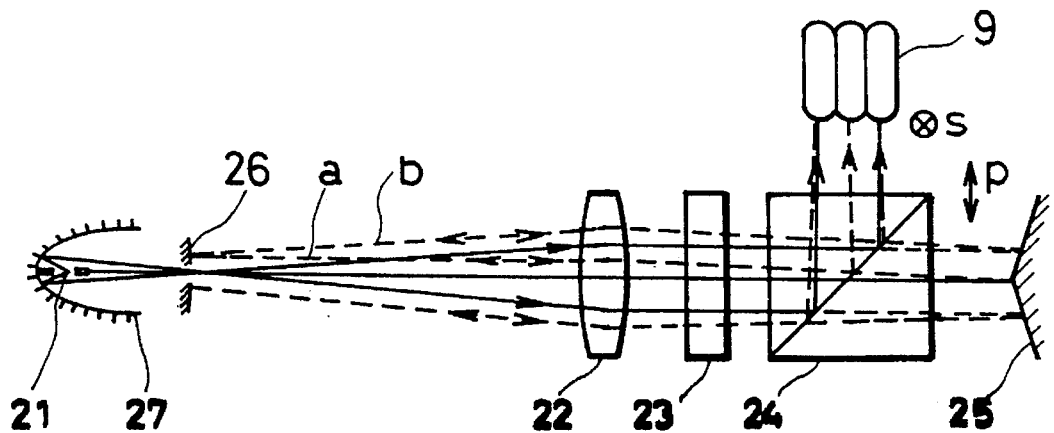
FIG. 3 is a schematic diagram showing the construction of an illumination optical system according to a third embodiment of the present invention.

Referring now to FIG. 3, there is illustrated a third embodiment of the present invention which comprises an illumination optical system of the same construction as the first embodiment excepting that a conical convex mirror is used as a first reflecting member 25 and a ring mirror 26 is used as a second reflecting member. The light from a light source 21 is first converged to a first imaging position by an ellipsoidal mirror 27 and then it falls as a diffusing light beam on a condenser lens 22. The incident light on the condenser lens 22 is converged to a substantially parallel beam by this condenser lens and then it falls on a quarter-wave plate 23. The incident light on the quarter-wave plate 23 is transmitted through it to fall on a PBS 24. Of the incident light on the PBS 24 the S-polarized light component is reflected inside the PBS 24 and emitted as an illumination light upwardly in the Figure toward an object such as a liquid crystal light valve.

Of the incident light on the PBS 24 the P-polarized light component is transmitted through the PBS 24 and it is then reflected coaxially by the first reflecting member 25 the conical shape. The resulting reflected backward light consists of a cylindrical light beam which has a ring-like sectional shape and which diffuses slightly and this backward light is transmitted again but in the opposite direction through the PBS 24. The backward light transmitted through the PBS 24 is then transmitted through the quarter-wave plate 23 to produce a circularly-polarized light. This circularly-polarized light is converged by the condenser lens 22 so that a ring of light encircling the optical axis is formed at a second imaging position which is diametrically apart from the first imaging position. A ring-shaped second reflecting member 26 is arranged at the second imaging position and therefore the circularly-polarized backward light is again reflected by the second reflecting member. This rereflected light is again transmitted through the condenser lens 22 and the quarter-wave plate 23 so that it is converted to an S-polarized light and this S-polarized light falls on the PBS 24. The S-polarized light incident on the PBS 24 is reflected inside the PBS 24 and emitted as an illumination light upwardly in the Figure toward the object.

In FIG. 3, the backward light indicated at symbols a and b change places with each other due to the reflection by the second reflecting member 26. By virtue of this construction of the present embodiment, there is the effect of making all the light beam within the optical system to have a rotationally symmetrical shape and thereby further reducing the illumination irregularity on an object to be illuminated.

Also, while the first reflecting member 25 having a reflecting surface of conic-convex shape is used in this embodiment, the shape of the reflecting surface of the first reflecting member 25 is not limited thereto and the reflecting surface may for example be composed of a pyramidal surface or quadric surface. Also, the reflecting surface shape of the first reflecting member 25 may for example be a concave surface. Still further, the second reflecting member 26 is not limited to a plane perpendicular to the optical axis.

Still further, by arranging a fly-eye lens 9 in the exit optical path from the PBS 24 as shown in the Figure, it is possible to further increase the uniformity of the illumination within the illumination area. In this case, the most efficient illumination can be attained by arranging the plane of incidence of the fly-eye lens 9 at the same distance as the first reflecting member 25 to the condenser lens 22 and by constructing the optical system in such a manner that the light reflected in the inclined surface of the first reflecting member 25 is reflected by the second reflecting member 26 in substantially the same direction as the direction of incidence.

Figure 4:
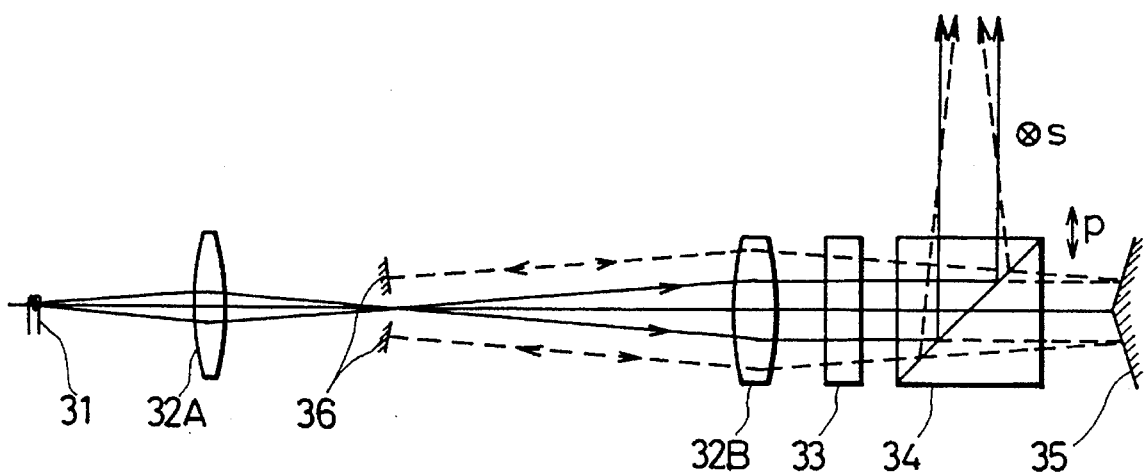
FIG. 4 is a schematic diagram showing the construction of an illumination optical system according to a fourth embodiment of the present invention.

FIG. 4 illustrates a fourth embodiment of the present invention which comprises an illumination optical system of substantially the same construction as the third embodiment excepting that an incandenscent lamp is used as a light source 31. The light from the light source 31 is first converged at a first imaging position by a condenser lens 32A and it is then converted to a diffusing light beam to fall another condenser lens 32B. This incident light is converged to a substantially parallel light beam by the condenser lens 32B and then it falls on a quarter-wave plate 33. The parallel beam incident on the quarter-wave plate 33 is transmitted therethrough to fall on a PBS 34. Of the light incident on the PBS 34 the S-polariged light component is reflected inside the PBS 34 and emitted as an illumination light upwardly in the Fuigure toward an object such as a liquid crystal light valve.

Of the light incident on the PBS 34 the P-polarized light component is transmitted through the PBS 34 and it is then reflected by the first reflecting member 35 of the conical shape. The reflected backward light is transmitted again but in the opposite direction through the PBS 34. The backward light transmitted through the PBS 34 is then transmitted through the quarter-wave plate 33 to produce a circularly-polarized light. This circularly-polarized backward light is converged by the condenser lens 32B so that a ring of light enclosing the optical axis is formed at a second imaging position which is diametrically apart from the first imaging position. A second reflecting member 36 of a ring shape is arranged at the second imaging position and thus the circularly-polarized backward light is reflected again. This rereflected light is again transmitted through the condenser lens 32B and the quarter-wave plate 33 so as to be converted to an S-polarized light and this S-polarized light falls on the PBS 34. The S-polarized light incident on the PBS 34 is reflected inside the PBS 34 and emitted as an illumination light upwardly in the Figure toward the object.

Figure 5:
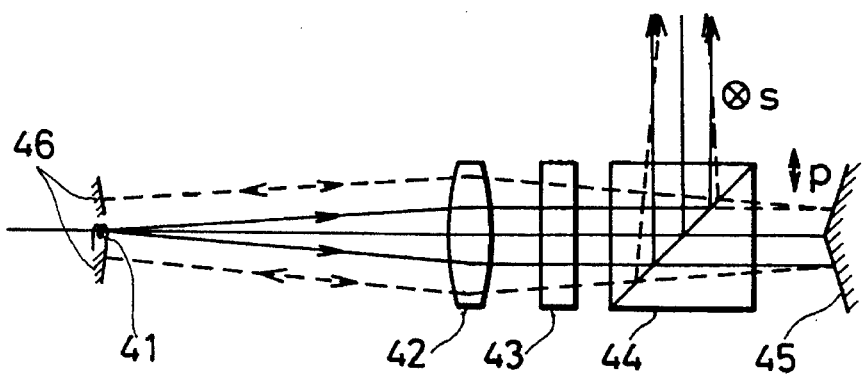
FIG. 5 is a schematic diagram showing the construction of an illumination optical system according to a fifth embodiment of the present invention.

Referring now to FIG. 5, there is illustrated a fifth embodiment of the present invention corresponding to an illumination optical system which is a simplified version of the fourth embodiment. In other words, the fifth embodiment differs from the fourth embodiment in that a single condenser lens 42 is used in place of the two condenser lenses 32A and 32B. The light from a light source 41 is converged to a substantially parallel light beam by the condenser lens 42 and this parallel light beam is transmitted through a quarter-wave plate 43 to fall on a PBS 44. Of the light incident on the PBS 44, the S-polarized light component is reflected inside the PBS 44 and emitted as an illumination light upwardly in the Figure toward an object such as a liquid crystal light valve.

Of the light incident on the PBS 44 the P-polarized light component is transmitted through the PBS 44 and it is then reflected by a first reflecting member 45 to produce a backward light. This backward light is transmitted again but in the opposite direction through the PBS 44 and it is then transmitted through the quarter-wave plate 43 threrby producing a circularly-polarized light. This circularly-polarized backward light is converged by the condenser lens 42 so that a ring of light enclosing the optical axis is formed at an imaging position which is diametrically apart from the light source 41. A second reflecting member 46 of a ring shape is arranged at this imaging position and therefore the circularly-polarized backward light is reflected again by the second reflecting member 46. This rereflected light is again transmitted through the condenser lens 42 and the quarter-wave plate 43 so as to be converted to an S-polarized light and this S-polarized light falls on the PBS 44. The S-polarized light incident on the PBS 44 is reflected inside the PBS 44 and emitted as an illumination light upwardly in the Figure toward the object. The remainder is the same as the fourth embodiment and thus both the direct illumination light from the light source and the illumination light due to the polarized backward light component are produced from the PBS 44.

Figure 6:
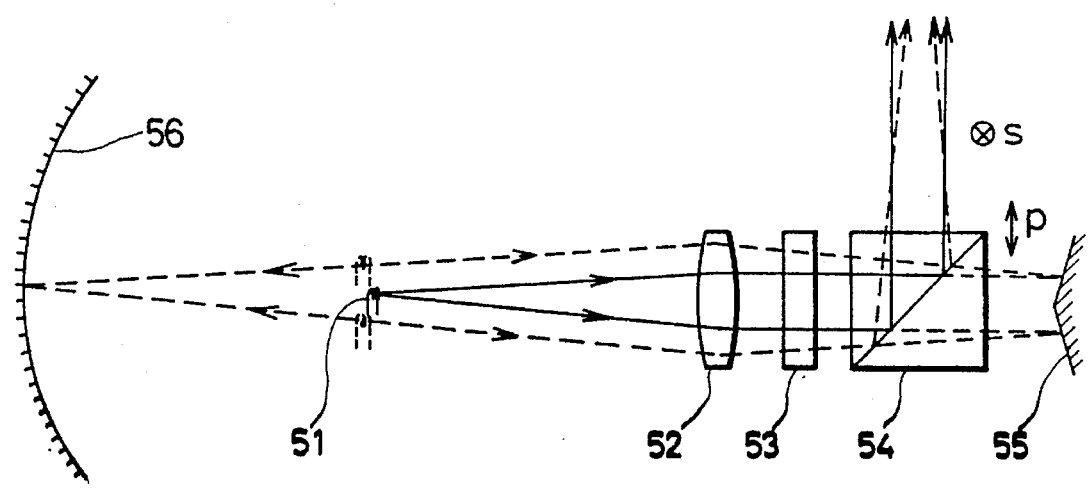
FIG. 6 is a schematic diagram showing the construction of an illumination optical system according to a sixth embodiment of the present invention.

Referring now to FIG. 6, there is illustrated a sixth embodiment of the present invention which is directed to an illumination optical system including a second reflecting member 56 composed of a concave mirror. The second reflecting member 56 is arranged in such a manner that a light source image is formed in a ring-like manner around a light source 51 due to the backward light from a first reflecting member 55. In this case, the second reflecting member 56 is a concave mirror whose center of the sphere is positioned at the central portion of the light source 51 and it is arranged on the opposite side to the illumination side (on the left side in the Figure) with respect to the light source 51.

The light emitted from the light source 51 is converged to a substantially parallel light beam by a condenser lens 52 so that the parallel light beam passes through a quarter-wave plate 53 and then falls on a PBS 54. Of the light incident on the PBS 54 the S-polarized light component is reflected inside the PBS 54 and emitted as an illumination light upwardly in the Figure toward an object such as a liquid crystal light valve.

Of the light incident on the PBS 54 the P-polarized light component is transmitted through the PBS 54 and it is then reflected by the first reflecting member 55 of a conical shape thereby producing a backward light. This backward light is transmitted again but in the opposite direction through the PBS 54 and it is then transmitted through the quarter-wave plate 53, thereby producing a circularly-polarized light. This circularly-polarized backward light is converged on the reflecting surface of the second reflecting member 56 by the condenser lens 52. The rereflected light from the second reflecting member 56 is passed through the same optical path to fall on the condenser lens 52. During the interval, a light source image is formed in a ring-like manner around the light source 51.

The rereflected light falling from the second reflecting member 56 on the condenser lems 52 is directed to the quarter-wave plate 53 from the condenser lems 52 which in turn converts it to an S-polarized light. This S-polarized light falls on the PBS 54 so that it is reflected inside the PBS 54 and emitted as an illumination light upwardly in the Figure toward the object. Also, the sixth embodiment has an additional advantage that the light emitted from the light source 51 in the opposite side to the illumination side (to the right in the Figure) is returned to the light source 51 by the second reflecting member 56 so as to utilize at least part of it as an illumination light.

Figure 7:
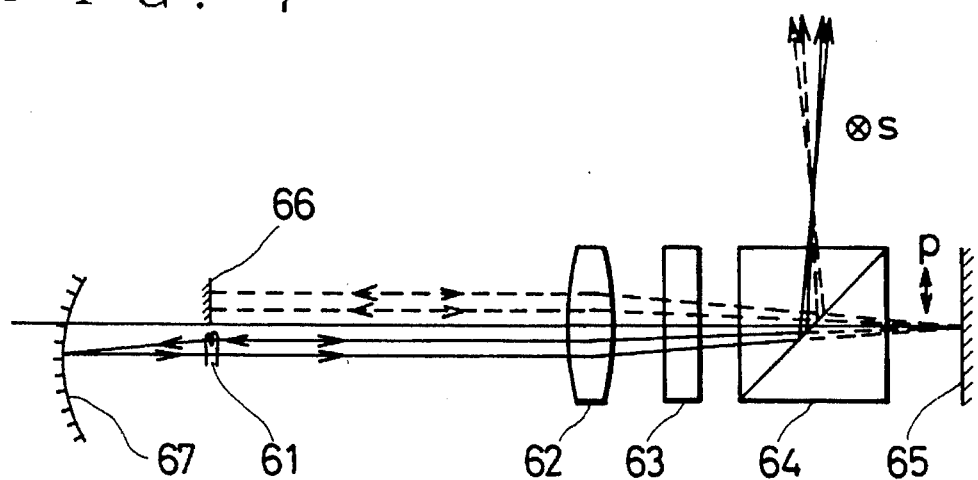
FIG. 7 is a schematic diagram showing the construction of an illumination optical system according to a seventh embodiment of the present invention.

Referring now to FIG. 7, there is illustrated a seventh embodiment of the present invention. An illumination optical system according to the seventh embodiment includes a third reflecting member 67 arranged such that the light emitted froma light source 61 in the opposite direction to the illumination direction is also utilized as an illumination light. The light emitted to the illumination side from the light soruce 61 and the light emitted from the light source 61 in the opposite direction to the illumination side and reflected by the third reflecting member 67 are both caused to fall on a condenser lens 62 and are then passed through a quarter-wave plate 63 to fall on a PBS 64. Of the light incident on the PBS 64 the S-polarized light component is reflected inside the PBS 64 and emitted as an illumination light upwardly toward an object such as a liquid crystal light valve.

Of the light incident on the PBS 64 the P-polarized light component is transmitted through the PBS 64 and it is then reflected by a first reflecting member 65. This reflected light is transmitted again but in the opposite direction through the PBS 64 and the quarter-wave member 63 so that it is directed as a circularly-polarized light to the condenser lens 62 from the quarter-wave plate 63. The circularly-polarized backward light transmitted through the condenser lens 62 is reflected by a second reflecting member 66 so that thereafter, in the like manner as the previously mentioned second embodiment, the backward light is transmitted through the condenser lens 62 and the quarter-wave plate 63, falls as an S-polarized light on the PBS 64, reflected inside the PBS 64 and emitted as an illumination light upwardly toward the object.

In accordance with the seventh embodiment, the light emitted from the light source in the opposite direction to the illumination direction is also utilized as an illumination light and therefore the utilization rate of the light from the light source can be increased exceedingly.

It is to be noted that various changes and modifications can be made to the seventh embodiment so that as for example, the seventh embodiment can be constructed to use two condenser lens as the previously mentioned fourth emodiment, to compose each of the first and second reflecting members 65 and 66 with a conical or pyramidal reflecting surface or to three-dimensionally arrange the light source 61 and the second and third reflecting members 66 and 67.

Figure 8:
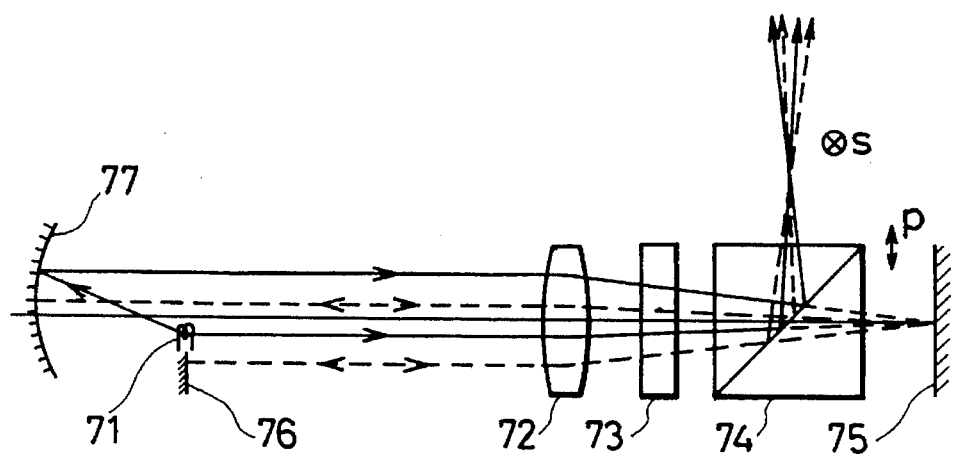
FIG. 8 is a schematic diagram showing the construction of an illumination optical system according to a eighth embodiment of the present invention.

FIG. 8 shows an eighth embodiment of the present invention directed to an illumination optical system which is an improvement on the seventh embodiment. The eighth embodiment is the same as the seventh embodiment in that the light emitted in the illumination direction from a light source 71 and the light emitted in the opposite direction to the illumination direction and reflected by a third reflecting member 77 are both used as illumination light. However, it is to be noted that in the eighth embodiment the third reflecting member 77 is also utilized in addition to a second reflecting member 76 so that the backward light due to a first reflecting member 75 of the light emitted in the illumination direction from the light source 71 is again reflected to the illumination side.

Referring to the light emitted in the opposite direction to the illumination direction from the light source 71, this light is first reflected from the third reflecting member 77 and the reflected light is directed to a quarter-wave plate 73 through a condenser lens 72. The light passed through the quarter-wave plate 73 falls on a PBS 74 so that of the incident light the S-polarized light component is reflected inside the PBS 74 and emitted as an illumination light upwardly toward an object such as a liquid crystal light valve.

Of the light incident on the PBS 74 the P-polarized light component is transmitted through the PBS 74 and it is then reflected by the first reflecting member 75. The backward light reflected by the first reflecting member 75 is transmitted again but in the opposite direction through the PBS 74 and also the quarter-wave plate 73 so that it falls as a circularly-polarized light on the condenser lens 72 from the quarter-wave plate 73. This circularly-polarized backward light is converged on the reflecting surface of the second reflecting member 76 by the condenser lens 72. The rereflected light from the second reflecting member 76 is again transmitted through the condenser lens 72 and the quarter-wave plate 73 and converted to an S-polarized light. This S-polarized light falls on the PBS 74 so that the light is reflected inside the PBS 74 and emitted as an illumination light upwardly in the Figure toward the object.

Figure 9:
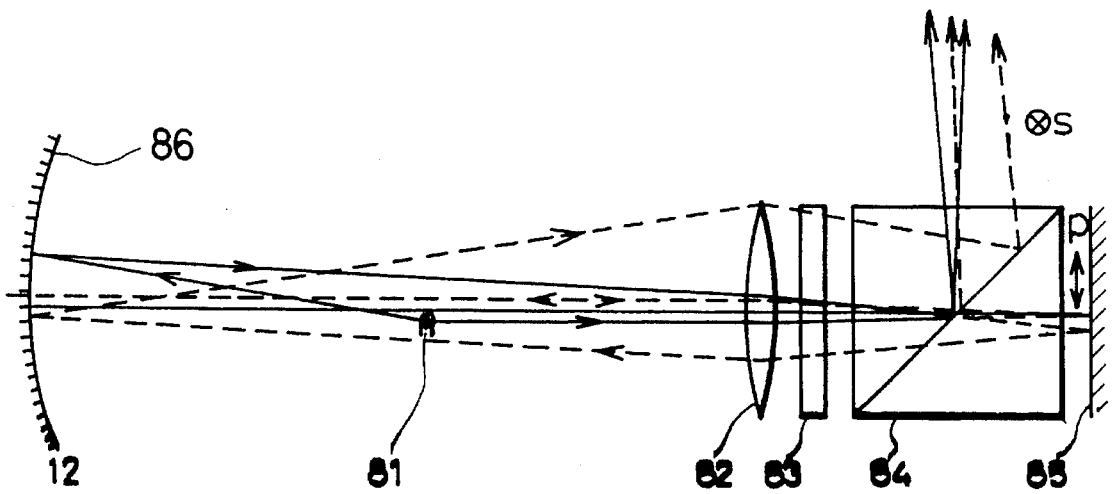
FIG. 9 is a schematic diagram showing the construction of an illumination optical system according to a ninth embodiment of the present invention.

Referring now to FIG. 9, there is illustrated a ninth embodiment of the present invention directed to an illumination optical system representing a modification of the eighth embodiment which is simplified in construction in that a single reflecting member is used to concurrently serve as a second reflecting member as well as a third reflecting member. The light emitted in the illumination direction from a light source 81 and the light emitted from the light source 81 in the opposite direction to the illumination direction and reflected by a second reflecting member 86 are respectively caused to fall on a quarter-wave plate 83 through a condenser lens 82. These incident beams are transmitted through the quarter-wave plate 83 and[ then they fall on a PBS 84. Of the light incident on the PBS 84 the S-polarized light component is reflected inside the PBS 84 and emitted as an illumination light upwardly toward an object such as a liquid crystal light valve.

Of the light incident on the PBS 84 the P-polarized light component is transmitted through the PBS 84 and it is then reflected by a first reflecting member 85, thereby producing a backward light. This backward light is transmitted again but in the opposite direction through the PBS 84 and the quarter-wave plate 83, converted to circularly-polarized light and returned to the source side through the condenser lens 82. By virtue of this circularly-polarized backward light, a light source image is formed at a position apart from the source 81 in a direction substantially perpendicular to the optical axis of the condenser lens 82. The circularly-polarized backward light is thereafter reflected again by the second reflecting member 86 so that this reflected light falls on the quarter-wave plate 83 through the condenser lens 82 and then it falls as S-polarized light on the PBS 84. This S-polarized light is reflected inside the PBS 84 and irradiated as an illumination light upwardly toward the object.

In the above-described sixth to ninth embodiments, the light emitted from the light source in the opposite direction to the illumination direction is also utilized as an illumination light for an object by means of the third or second reflecting member. It is needless to say that such effective utilization of the light from the source can similarly be made possible even in the second, fourth and fifth embodiments by arranging a reflecting mirror or the like on the opposite side to the illumination side with respect to the light source.

Figure 10:
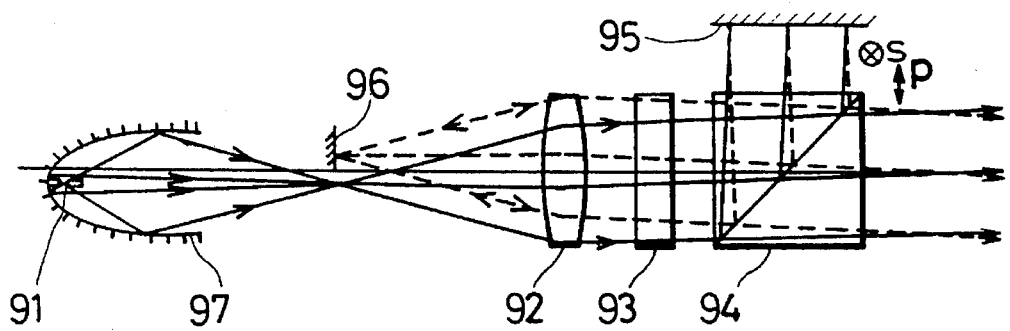
FIG. 10 is a schematic diagram showing the construction of an illumination optical system according to a tenth embodiment of the present invention.

Also, while, in the above-described embodiments, the polarized light component reflected inside the PBS (the S-polarized light in the embodiments) is used as the illumination light for an object, it may be replaced with the polarized-light component transmitted through the PBS (the P-polarized light in the embodiments) for use as the illumination light. FIG. 10 shows an exemplary illumination optical system in which the P-polarized light component transmitted through a PBS is used as an illumination light.

In FIG. 10, the light from a light source 91 is first converged to a first imaging position by an elliptical mirror 97 so that it is converted to a diffusing light beam and falls on a condenser lens 92. After the light beam has been converged to a substantially parallel light beam by the condenser lens 92, it is transmitted through a quarter-wave plate 93 and then it falls on a PBS 94. Of the light incident on the PBS 94 the P-polarized light component is transmitted through the PBS 94 and it is emitted, as being in the transmission direction, as an illumination light toward an object to be illuminated.

On the other hand, of the light incident on the PBS 94 the S-polarized light component is reflected inside the PBS 94 and it is then reflected by a first reflecting member 95 arranged above the PBS 94 to face it thereby returning it into the PBS 94. This backward light is reflected inside the PBS 94 so that it is directed toward the light source side and then transmitted through the quarter-wave plate 93 thereby producing a circularly-polarized light. This circularly-polarized light is converged through the condenser lens 92 to a second imaging position which is apart from the first imaging position in a direction perpendicular to the optical axis of the condenser lens 92 and thus a light source image is formed at the second imaging position. A second reflecting member 96 is arranged at the second imaging position. As a result, the circularly-polarized backward light from the condenser lens 92 is again reflected by the second reflecting member 96 so that it is converted to a diffusing light beam and falls on the condenser lens 92. By virtue of this incident light, a substantially parallel beam is directed from the condenser lens 92 to the quarter-wave plate 93 and this parallel light beam is directed as a P- polarized light to the PBS 94 from the quarter-wave plate 93.. This P-polarized light is transmitted as such through the PBS 94 and then transmitted as an illumination light toward the object.

With the embodiments described above, in order that a light source image due to the backward light from the first reflecting member may be formed at a position apart from the light source or a position conjugate to the light source in a direction perpendicular to the optical axis of the condenser lens, it is desirable that not only the light source is arranged at a position apart from the said optical axis but also the reflecting surface of the first reflecting member is inclined for adjusting purposes.

Also, as in the third embodiment shown in FIG. 3, in the other embodiments a fly-eye lens may be arranged at the exit position of the illumination light so as to further improve the uniformity of the illumination distribution.

Figure 11:
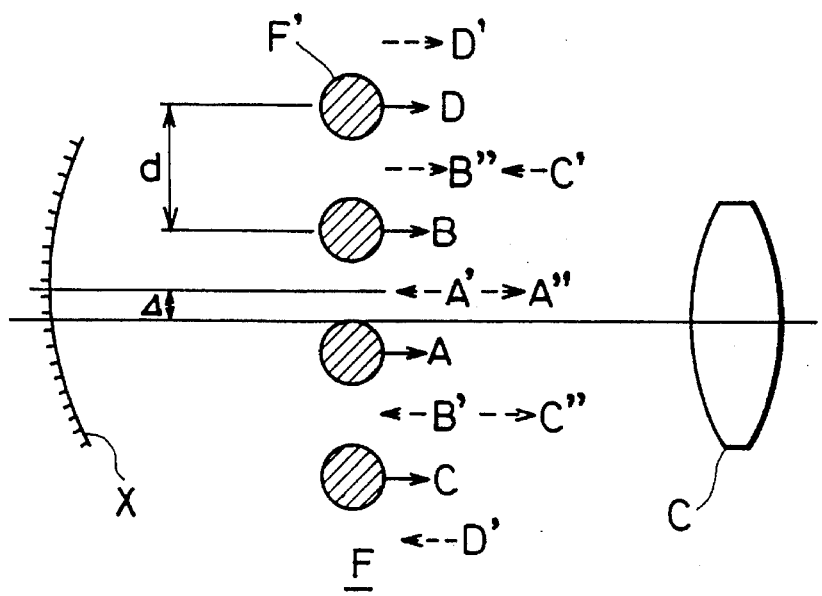
FIG. 11 is a schematic diagram showing the construction of an illumination optical system according to an eleventh embodiment of the present invention.

Referring now to FIG. 11, there is illustrated the principal part of an eleventh embodiment which is directed to an illumination optical system of the type utilizing a spatially discrete light source F such as a lamp having loosely wound filaments. In other words, in the sixth embodiment shown in FIG. 6, for example, a reflecting mirror or the like is arranged on the opposite side to the illumination side relative to the light source so that the light emitted from the light source in the opposite direction to the illumination direction is also effectively utilized as an illumination light for an object as previously mentioned. In connection with such effective utilization of the light from the light source, FIG. 11 illustrates an example of the desirable relative positional relation between the discrete light source F, a second reflecting member X (e.g., the reflecting member 56 in the sixth embodiment) and the backward light (A', B', C', D') from the illumination side, respectively.

Assuming now that the light source is a discrete light source F such as mentioned previously, as shown in FIG. 11, backward light A, B, C and D directed in the illumination direction from a plurality of filaments F' of the discrete light source F which are substantially spaced apart from each other, are reflected by a first reflecting member on the illumination side which is not shown in FIG. 11 and part of these light are returned as backward light A', B', C' and D' to the light source side through a condenser lens C. These backward light are reflected by the second reflecting member X to produce rereflected light A", B", C" an D" which are directed again toward the illumination side.

While, in this case, the rereflected light A", B", C" and D" are caused to produce the respective filament images due to the condenser lens C and the second reflecting member X, in the case of the arrangement of FIG. 11 the previously mentioned relative positional relations are determined in such a manner that each of the filament images is formed in substantially the middle portion of the corresponding one of the spacings between the filaments F'. In other words, assuming that the filaments F' are each wound at a constant pitch which provides a spacing d/2 (d represents the spacing distance between the filaments F' of the light source F) equal to its diameter in FIG. 11, the discrete light source F, the second reflecting member X and the condenser lens C are arranged so that the deviation $\Delta$ between the optical axis of the second reflecting member and the optical axis of the condenser lens C satisfies the relation $\Delta=(1/4)d$ and also the deviation between the center of the filament spacing and the optical axis of the second reflecting member X also becomes $\Delta$. By virtue of this arrangement, the rereflected light due to the second reflecting member X are not shielded by the filaments F' and the utilization rate of the light from the light source is increased correspondingly.

Figure 12:
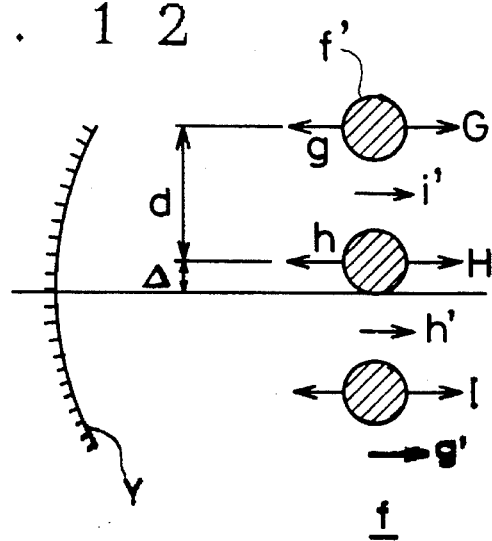
FIG. 12 is a schematic diagram showing the construction of an illumination optical system according to a twelvth embodiment of the present invention.

Referring now to FIG. 12, there is illustrated a twelvth embodiment of the present invention which shows an example of the desired relative positional relation between a light source f having discretely arranged filaments f' as in the case of FIG. 11 and a third reflecting member Y (e.g., the reflecting member 67 of the seventh embodiment). In FIG. 12, this relative positional relation is determined in such a manner that the light g, h and i emitted from the respective filaments f' of the discrete light source f are reflected by the third reflecting member Y and the resulting reflected light g', h' and i' are respectively passed between the filaments f' so as to be directed in the illumination direction. In this case, the deviation $\Delta$ between the center of the filament spacings and the optical axis of the third reflecting member Y satisfies $\Delta=(1/4)d$ (d is the spacing distance between the filaments f') in accordance with the same assumption as mentioned previously.

With the embodiments shown above, the present invention can be used not only as an illumination apparatus for liquid crystal projectors but also as a headlight for automotive vehicles, for example. In this case, the illumination is effected by polarization and therefore there are effects that if, for example, the back mirror of a preceding vehicle or the windshield of an approaching vehicle is provided with a polarization characteristic, it is possible to obtain a dazzle-free effect and so on. Also, the present invention can be advantageously used in other fields of utilization including for example a polarized illumination optical system of exposure apparatus used in the manufacture of semi-conductor devices. This can be realized by utilizing for example the third embodiment shown in FIG. 3 in such a manner that the main condenser lens of an exposure apparatus is arranged in the rear of the fly-eye lens 9 so as to illuminate an object to be illuminated, e.g., a reticle by the exit light of the main condenser lens.

What is claimed is:

1. An illumination optical system for supplying polarized illumination light to an object to be illuminated, said system comprising:

a light source;

polarizing light splitting means for separating light emitted from said light source into a first polarized light component as said illumination light and a second polarized light component which is different in polarizing direction from said first polarized light component;

a first reflecting optical member for reflecting said second polarized light component to return the same as backward light in the direction of said light source;

a polarizing element for changing a polarizing condition of said backward light from said first reflecting optical member;

a converging optical system arranged between said light source and said first reflecting optical member; and a second reflecting optical member for reflecting said backward light, with the polarizing condition changed by said polarizing element, into rereflected light having the same direction as light emitted from said light source with said polarizing light splitting means, said first reflecting optical member and said converging optical system being arranged relative to said light source such that an image of said light source due to said backward light from said first reflecting member is formed at a position apart from a position of said light source or conjugate position thereof with respect to a direction substantially perpendicular to an optical axis of said converging optical system to cause said first polarized light component and said second polarized light component to combine into uniformly polarized illumination light.

2. An illumination optical system according to claim 1, wherein said second reflecting optical member is arranged at the position of the image of said light source due to said backward light.

3. An illumination optical system according to claim 1, wherein said second reflecting optical member is arranged to reflect said backward light and wherein an image of said light source is formed at a position apart from said light source with respect to a direction substantially perpendicular to the optical axis of said converging optical system.

4. An illumination optical system according to claim 1, further comprising a third reflecting optical member for reflecting light emitted from said light source in a direction different from said illumination light, said third reflecting optical member being arranged in such a manner that an image of said light source due to the reflected light from said third reflecting optical member is formed at a position apart from said light source with respect to a direction substantially perpendicular to the optical axis of said converging optical system.

5. An illumination optical system according to claim 4, wherein said third reflecting optical member comprises a concave mirror.

6. An illumination optical system according to claim 1, wherein said polarizing element comprises a quarter-wave plate.

7. An illumination optical system according to claim 1, wherein said polarizing light splitting means comprises a polarizing beam splitter.

8. An illumination optical system according to claim 1, wherein said polarizing light splitting means converts incident light from said light source into said first and second polarized light components with the first polarized light component reflected inside thereof and said second polarized light component transmitted therethrough.

9. An illumination optical system according to claim 1, wherein said polarizing light splitting means converts incident light from said light source into said first and second polarized light components with the first polarized component transmitted therethrough and said second polarized light component reflected inside thereof.

10. An illumination optical system according to claim 1, wherein said first reflecting optical member has a conical reflecting surface.

11. An illumination optical system according to claim 1, wherein said second reflecting optical member comprises a concave mirror arranged at a position to reflect light emitted from said light source in a direction different from the illumination light.

* * * * *